(12) United States Patent
Stieglitz et al.

(10) Patent No.: US 12,157,344 B2
(45) Date of Patent: Dec. 3, 2024

(54) LOAD INTRODUCTION ELEMENT FOR A CHASSIS COMPONENT, METHOD FOR PRODUCING A LOAD INTRODUCTION ELEMENT, AND CHASSIS COMPONENT

(71) Applicant: ZF Friedrichshafen AG, Friedrichshafen (DE)

(72) Inventors: Andre Stieglitz, Osnabrück (DE); Ingolf Müller, Freimersheim (DE); Eva Sophie Jurgeleit, Troisdorf (DE); Paul Niemöller, Wildeshausen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/278,527

(22) PCT Filed: Dec. 10, 2021

(86) PCT No.: PCT/EP2021/085118
§ 371 (c)(1),
(2) Date: Aug. 23, 2023

(87) PCT Pub. No.: WO2022/179737
PCT Pub. Date: Sep. 1, 2022

(65) Prior Publication Data
US 2024/0123783 A1    Apr. 18, 2024

(30) Foreign Application Priority Data
Feb. 24, 2021    (DE) ...................... 10 2021 201 719.3

(51) Int. Cl.
*B60G 7/00*    (2006.01)
(52) U.S. Cl.
CPC ............. *B60G 7/001* (2013.01); *B60G 7/005* (2013.01); *B60G 2204/416* (2013.01); *B60G 2206/7101* (2013.01)

(58) Field of Classification Search
CPC .. B60G 7/001; B60G 7/005; B60G 2204/416; B60G 2206/7101
See application file for complete search history.

(56) References Cited

U.S. PATENT DOCUMENTS

| 3,549,167 | A | 12/1970 | Haverbeck |
| 6,254,114 | B1 | 7/2001 | Pulling |
| (Continued) | | | |

FOREIGN PATENT DOCUMENTS

| DE | 10 2015 216 209 | 3/2017 |
| DE | 10 2015 218 024 | 3/2017 |
| (Continued) | | |

OTHER PUBLICATIONS

Search Report dated Feb. 18, 2022, issued in German Patent Application No. 102021201719.3.

*Primary Examiner* — Faye M Fleming
(74) *Attorney, Agent, or Firm* — Cozen O'Connor

(57) ABSTRACT

A load introduction element (3) for a chassis component (1) of a chassis, having a receiving opening (5) for receiving a joint arrangement (6) and a spline (8) with teeth (9A, 9B) extending substantially axially parallel to the longitudinal axis of the load introduction element (3), The load introduction element (3) is made from a fiber-reinforced plastic semifinished product, and has flat blanks (13, 14, 15) of the plastic semifinished product which are arranged one above the other in layers in an assembly direction (AR) and form a base body (11) of the load introduction element (3), wherein the blanks (13, 14, 15) of the base body (11) have at least two different geometries with different preferential fiber directions (20, 21).

22 Claims, 8 Drawing Sheets

(56) References Cited

U.S. PATENT DOCUMENTS

| | | | |
|---|---|---|---|
| 11,485,185 B2 * | 11/2022 | Stieglitz | ................. B60G 7/001 |
| 11,642,927 B2 * | 5/2023 | Stieglitz | ................. F16C 7/026 |
| | | | 280/124.111 |
| 2002/0096799 A1 | 7/2002 | Kim | |

FOREIGN PATENT DOCUMENTS

| | | | | |
|---|---|---|---|---|
| DE | 10 2016 211211 | | 12/2017 | |
| DE | 10 2016 223383 | | 5/2018 | |
| DE | 10 2017 207 164 | | 10/2018 | |
| DE | 10 2017 211 625 | | 1/2019 | |
| DE | 10 2017 213 563 | | 2/2019 | |
| DE | 10 2018 101 334 | | 7/2019 | |
| DE | 10 2018 209269 | | 9/2019 | |
| DE | 102019206792 | A1 * | 11/2020 | |
| DE | 10 2019 210184 | | 1/2021 | |
| DE | 102021204420 | A1 * | 11/2022 | ............ B60G 7/001 |
| EP | 1 308 265 | | 5/2003 | |
| FR | 2 587 649 | | 3/1987 | |
| WO | WO 2011/141538 | | 11/2011 | |
| WO | WO 2019/025165 | | 2/2019 | |

\* cited by examiner

LOAD INTRODUCTION ELEMENT FOR A CHASSIS COMPONENT, METHOD FOR PRODUCING A LOAD INTRODUCTION ELEMENT, AND CHASSIS COMPONENT

PRIORITY CLAIM

This is a U.S. national stage of application No. PCT/EP2021/085118, filed on Dec. 10, 2021. Priority is claimed on German Application No. 10 2021 201 719.3, filed Feb. 24, 2021, the content of which is incorporated herein by reference.

BACKGROUND OF THE INVENTION

The invention is directed to a load introduction element for a chassis component. The present invention is further directed to a method for producing a load introduction element for a chassis component and to a chassis component for a.

In wheel suspensions, wheel carriers are connected to the vehicle body via intermediate links and joints, the links forming the rigid connections of the joints. Apart from wheel guidance functions, links are often also used for purposes of supporting the body by transmitting spring forces and damper forces. The joints are formed in particular by ball joints or molecular joints which are to be mounted in load introduction elements provided at the links for this purpose. The link can be a multipoint link, particularly a two-point link, an axle strut or a coupling rod. The link can also be constructed as a three-point link, four-point link or five-point link.

A chassis component of the type mentioned above is known from DE 10 2017 207 164 A1 in which the component is, in particular, a link for a wheel suspension. The link which is constructed as a two-point link has two articulation points which are constructed as ball joints arranged in a respective load introduction element produced from a metallic material. The load introduction elements are connected to one another by means of a profile component produced from a continuous-fiber reinforced plastic semifinished product. The links produced from metal and fiber-reinforced plastic are also known as hybrid links. As is well known, the ball joints comprise a joint body of metal and a bearing bush of plastic. The load introduction element is produced from metal, in particular from a suitable aluminum alloy, in an extrusion process in order to absorb the loads occurring during operation. To connect the profile component to the load introduction elements, a spline is formed at the end of the load introduction element and brought into positive engagement with hollow spaces arranged in the hollow profile for this purpose and are nondetachably connected to one another by an adhesive connection. The spline is formed during the extrusion in profile direction of the load introduction element. The load introduction element known from the prior art is disadvantageous in that the depth of the openings for forming the intervening spaces between teeth with a defined width of the openings with the aluminum alloy having the required strength is limited. In other words, the maximum length of the individual teeth of the spline is limited by the width of the spaces between the adjacent teeth. Further, in the extrusion method it is not possible, for example, to integrate steps in the load introduction element for securing a bearing bush or a cover.

SUMMARY OF THE INVENTION

Proceeding from the prior art described above, it is the object of the present invention to further develop a load introduction element and a method for producing a load introduction element of the type mentioned above that is characterized by a low material density and comparable material costs and production costs while retaining the same strength characteristics.

A load introduction element for a chassis component of a chassis is suggested according to an embodiment of the invention. The load introduction element comprises a receiving opening for receiving a joint arrangement and a spline with teeth extending substantially axially parallel to the longitudinal axis of the load introduction element. It is provided according to the invention that the load introduction element is made from a fiber-reinforced plastic semifinished product. The load introduction element comprises flat blanks of the plastic semifinished product which are arranged one above the other in layers in an assembly direction and form a base body of the load introduction element. The blanks have different geometries and different preferential fiber directions. A long-fiber reinforced duromer, e.g., SMC (sheet molding compound) or a continuous-fiber reinforced duromer (for example, prepreg) is used as fiber-reinforced plastic semifinished product from which the flat blanks are made. Utilizing SMC or prepreg, for example, is advantageous in that the load introduction element has a lower mass than a metal load introduction element according to the prior art. The load introduction element which is formed from the blanks arranged in layers offers the advantage over the metal load introduction element produced by extrusion that there are more geometric degrees of freedom. For example, steps or undercuts which are advantageous for inserting and securing the joint arrangement, or parts of the joint arrangement, can be made in the base body of the load introduction element. The blanks produced from SMC or prepreg as plastic semifinished product have a non-oriented component of reinforcement fibers and a portion of reinforcement fibers with a preferential fiber direction in their duromer matrix. The blanks have at least three different geometries and different preferential fiber directions and are arranged in a respective layer corresponding to their geometry to form the base body. The layered arrangement of the blanks with different geometries is carried out alternately symmetrically or asymmetrically in relation to the blanks to be arranged with different preferential fiber directions. The base body constructed according to the invention is preferably processed by wet molding, wherein the base body comprising the plastic semifinished product is placed in a heated die and compressed, which serves to impart the final shape and curing of the polymer matrix of the plastic semifinished product. The load introduction element according to the invention allows the substitution of a metallic structure while retaining key interfaces by constructing as a component from SMC semifinished product or prepreg semifinished product.

Further, the load introduction element can have a substantially U-shaped outer contour which is enclosed by at least one strip-shaped blank produced from the plastic semifinished product, the preferential fiber direction thereof extending perpendicular to the assembly direction. The strip-shaped blank circumferentially adjoins the outer contour of the load introduction element and extends between the outside tooth tips of the spline. The circumferential strip-shaped blank is cut out as a rectangle with the long side in the preferential fiber direction of the plastic semifinished product. The strip-shaped blank is tilted by 90° before contacting the base body so that the preferential fiber direction runs in circumferential direction around the base body of the load introduction element, i.e., perpendicular to the assembly direction. The strip-shaped blank is stressed primarily during tensile loading of the load introduction element. The strip-shaped blank particularly reinforces the area surrounding the receiving opening in which the joint arrangement is received.

Some of the blanks forming the base body can have a contour that corresponds to the complete cross-sectional profile of the load introduction element and some of the blanks can have a contour which partially describes the cross-sectional profile of the load introduction element. The blanks which partially describe the cross-sectional profile of the load introduction element are cut in a complementary manner so that these complementary blanks can be arranged side by side in a layer plane in order to complete the cross-sectional profile of the load introduction element in the respective layer plane.

In particular, the blanks corresponding to the complete cross-sectional profile can have a preferential fiber direction which extends parallel to the longitudinal axis of the load introduction element, while the blanks corresponding to the partial cross-sectional profile have a preferential fiber direction that is oriented to be inclined at an angle to the longitudinal axis. The longitudinal axis of the load introduction element forms the symmetry axis of the blanks which correspond to the complete cross-sectional profile of the load introduction element. Blanks with a preferential fiber direction oriented parallel to the longitudinal axis absorb tensile and compressive forces introduced through the joint arrangement. Blanks with a preferential fiber direction oriented to be inclined at an angle to the longitudinal axis correspondingly absorb substantially forces which enter the load introduction element through tilting movements in the region of the receiving opening. The forces can be deflected to middle teeth of the spline of the load introduction element by means of these blanks. The layered arrangement of the various blanks can be carried out with at least one blank with a preferential fiber direction oriented parallel to the longitudinal axis alternating with at least one pair of complementary blanks with a preferential fiber direction inside of a layer plane that is directed to be inclined at an angle to the longitudinal axis.

The blanks whose preferential fiber direction is oriented to be inclined at an angle to the longitudinal axis can preferably be arranged in a mirror-inverted manner inside of a layer plane. A uniform introduction of forces to the middle teeth of the spline is achieved in this way.

According to a preferred further development, a cartridge serving to receive the joint arrangement can be integrated in the receiving opening of the load introduction element. The cartridge which is made from a metallic material introduces the forces absorbed by the joint arrangement into the load introduction element.

To cover the joint arrangement, the receiving opening can be closed on one side by a cover which is formed integral with the load introduction element. To this end, at least one blank can be provided which is arranged on only one side of the base body in assembly direction and has no receiving opening.

Further, a radially inwardly directed step on which the cartridge and/or a bearing bush of the joint arrangement can be supported may be formed below the cover. The layered construction comprising individual blanks makes it possible to adapt the geometry of the base body to the form of such a step or an undercut in a simple manner.

In particular, the cartridge can be inserted into the receiving opening prior to a curing process so that a positive engagement connection is brought about by curing.

Alternatively, the cartridge can be inserted into the receiving opening after a curing process and bonded to the load introduction element by means of gluing.

According to a preferred embodiment form, a cylindrical sleeve which is formed to be open to one side and which receives a bearing bush and a spherical portion of a joint body of the joint arrangement can be integrated in the load introduction element by positive engagement. In so doing, the sleeve together with the bearing bush arranged therein and the spherical portion of the joint body arranged therein is inserted prior to the curing process into the receiving opening which is formed during the layer-by-layer assembly of the load introduction element in order that the sleeve is also integrated by material bonding during the subsequent molding and curing process. In an advantageous manner, the transverse forces transmitted from the spherical portion of the joint body to the bearing bush are absorbed by the sleeve as tensile forces.

To this end, the sleeve can have at its closed side a continuous bottom which merges into a radially outwardly directed bead-shaped portion which partially extends in longitudinal direction of the sleeve.

Further, the sleeve can have on its open side a flange-shaped portion which partially protrudes from the receiving opening. Due to its flowability, the plastic semifinished product of the base body can flow into the circumferential undercut of the flange-shaped portion during the molding and curing process so that a material bonding and positively engaging connection of the sleeve and load introduction element is achieved.

According to a preferred embodiment form, a cylindrical bushing which is formed open to both sides can be integrated in the load introduction element in a positively engaging manner. The bushing can serve to receive a joint arrangement constructed as a molecular joint.

According to a further embodiment, a spherical portion of a joint body of the joint arrangement can be integrated directly in the load introduction element. To this end, the spherical portion of the joint body can be arranged together with the blanks in the die in order to integrate the latter in the load introduction element by material bonding and positive engagement during the molding process and curing process.

A method is also described for producing a load introduction element. The load introduction element is formed with a receiving opening for receiving a joint arrangement and a spline. The method is characterized by the following method steps:
  a) cutting a plurality of blanks from a sheet-shaped plastic semifinished product, the blanks having at least two different geometries with different preferential fiber directions,
  b) arranging the blanks in layers one above the other in an assembly direction to form a base body of the load introduction element, and
  c) molding and curing the blanks which are layered to form a base body.

A long-fiber reinforced duromer, e.g., SMC (sheet molding compound), or a continuous-fiber reinforced duromer (prepreg) is used as fiber-reinforced plastic semifinished product from which the sheet-shaped blanks are made. The advantage in using SMC or prepreg consists in that the load introduction element produced by the method according to the invention has a lower mass than a load introduction element according to the prior art. In contrast to the load introduction element of metal produced by extrusion, the load introduction element constructed from the blanks arranged in layers provides more geometric degrees of freedom. Accordingly, steps or undercuts can be made in the base body of the load introduction element which are advantageous for inserting or securing the joint arrangement or components thereof.

The load introduction element can preferably have a substantially U-shaped outer contour which is enclosed by at least one strip-shaped blank which is produced from the plastic semifinished product and whose preferential fiber direction runs perpendicular to the assembly direction.

In particular, at least one component part of the joint arrangement can be inserted into the receiving opening before or after curing.

As at least one component part of the joint arrangement, a sleeve, a cartridge, a bushing or a spherical portion of a joint body can be inserted into the receiving opening. The sleeve or the cartridge can serve to receive a joint arrangement constructed as a ball joint. The bushing which is constructed to be open to both sides can serve to receive a joint arrangement constructed as molecular joint.

In particular, the component part can be inserted into the receiving opening after curing and connected to the load introduction element by gluing. Therefore, the component part is not exposed to thermal loads during the molding process and curing process.

Alternatively, the component part which is inserted into the receiving opening can be connected at least by material bonding to the load introduction element by means of the curing. Therefore, a machining step can be omitted.

Further, the above-stated object is met by a chassis component for a chassis. The chassis component comprises a body having at least two load introduction elements connected to one another by a profile component. The load introduction elements, respectively, have a receiving opening for receiving a joint arrangement. The load introduction elements are connected to one another with the profile component in a common connection portion by means of a glued spline.

The invention is not limited to the indicated combination of features of the independent claims or of the claims dependent thereon. Further, it is also possible to combine individual features as far as they arise from the claims, from the following description of preferred embodiment forms of the invention or directly from the drawings. When the claims refer to the drawings through the use of reference numerals, this is not intended to limit the protective scope of the claims.

BRIEF DESCRIPTION OF THE DRAWINGS

Advantageous embodiment forms of the invention which will be explained in the following are shown in the drawings. The drawings show.

DETAILED DESCRIPTION OF THE PRESENTLY PREFERRED EMBODIMENTS

Figure 1:
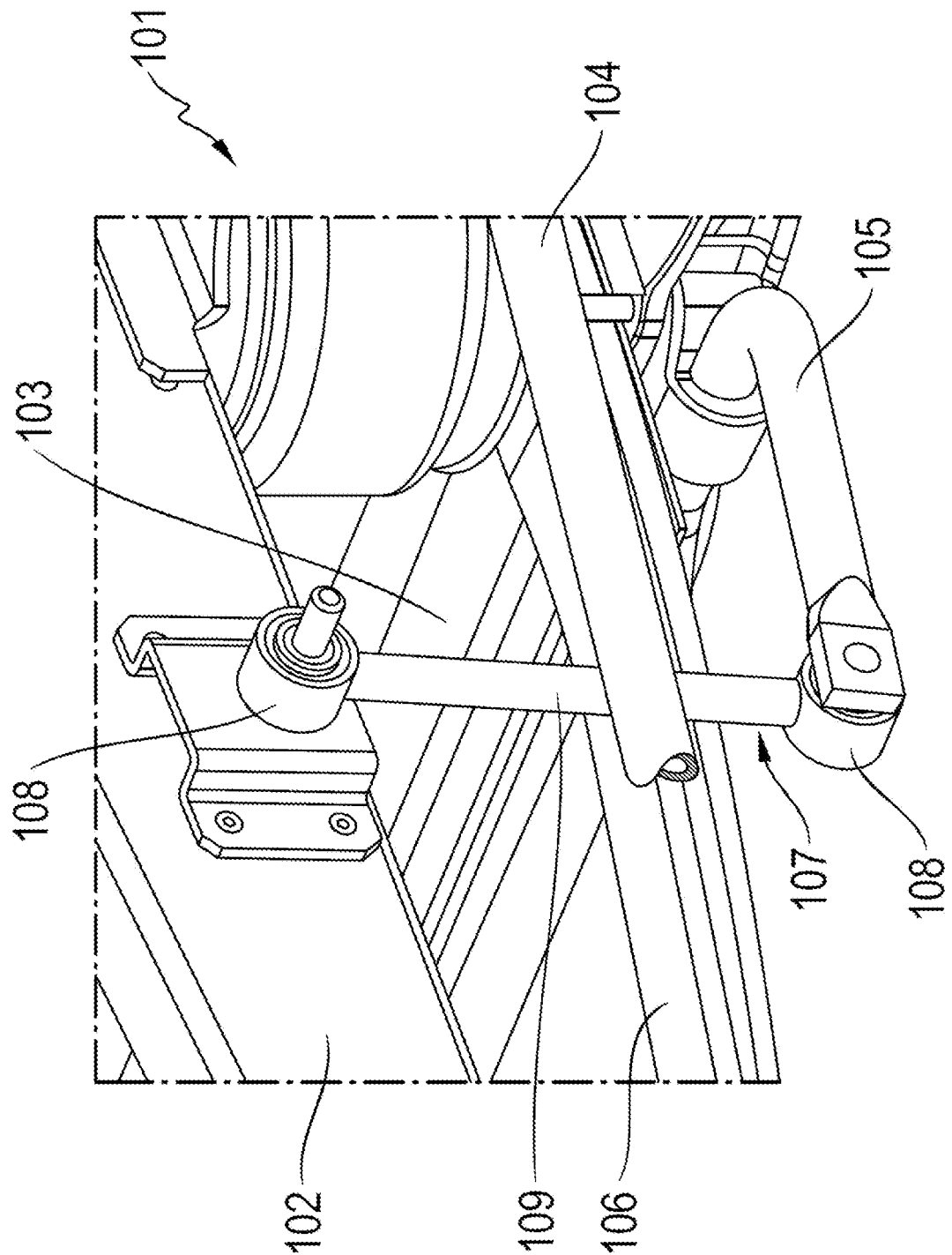
FIG. 1 a schematic partial view of a chassis according to the prior art.

FIG. 1 shows a schematic partial view of a chassis 101 of a vehicle, in particular a utility vehicle, according to the prior art. The chassis 101 comprises two longitudinal rails 102, a steerable axle 103 and a steering rod 104 extending in longitudinal direction of the vehicle. A U-shaped roll stabilizer 105 is arranged at the steerable axle 103. The roll stabilizer 105 is connected to the respective longitudinal rail 102 in an articulated manner by means of a respective two-point link 107—only one of which is shown in FIG. 1—associated with the roll stabilizer 105 at the end thereof. The two-point link 107 has at its end in each instance a load introduction region 108 at which the two-point link 107 is connected in an articulated manner to the roll stabilizer 105 or the longitudinal rail 102. The two-point links 107 arranged at the roll stabilizer 105 are constructed in this instance as coupling rods. A leaf spring assembly 106 which also extends in longitudinal direction of the vehicle is arranged below the longitudinal rail 102 and parallel to the steering rod 104. The two-point link 107 extends in vertical direction between the leaf spring assembly 106 and the steering rod 104. The installation space available transverse to the longitudinal direction of the vehicle between the leaf spring assembly 106 and the steering rod 104 is very limited. The two-point link 107 known from the prior art is produced from a metallic material so that the two-point link 107 has the necessary stiffness to prevent a buckling or bulging of a connection portion 109 due to the compressive forces which are to be absorbed by the two-point link 107 and which are introduced into the two-point link 107 by the load introduction regions 108 arranged opposite one another.

Figure 2:
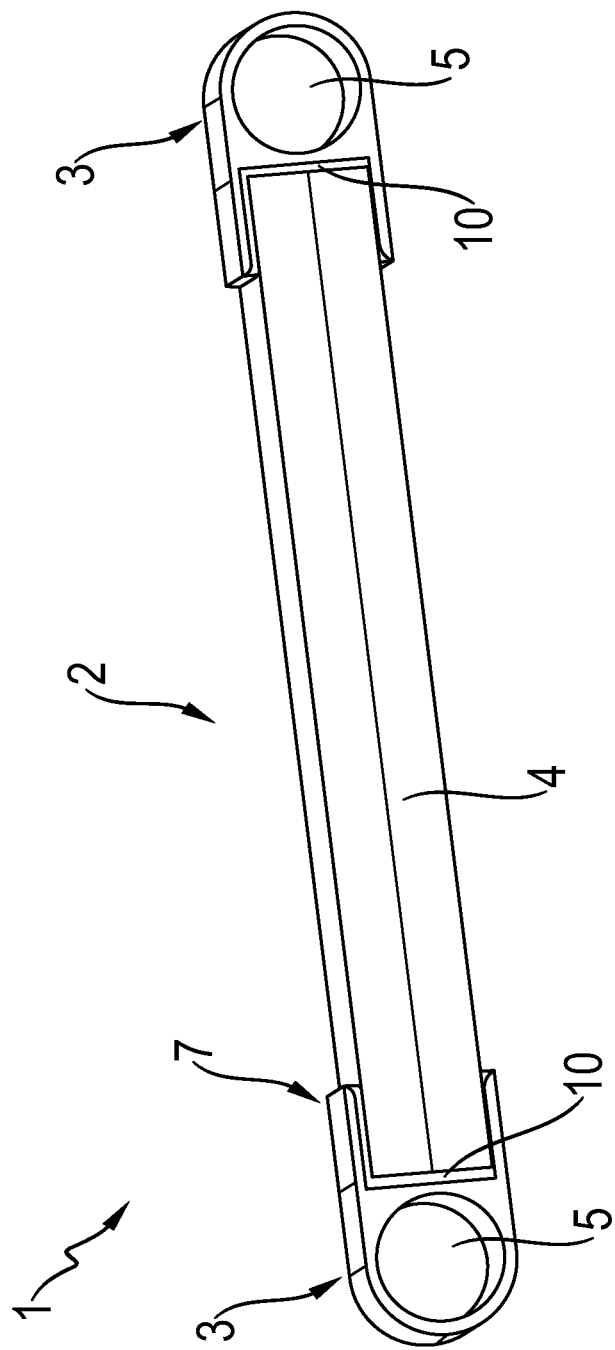
FIG. 2 a schematic perspective view of a chassis component.

FIG. 2 shows a schematic perspective view of a chassis component 1, particularly for a chassis 101. The chassis component 1 comprises a body 2 which has, in this instance and preferably, at least two load introduction elements 3. A chassis component 1 of this kind is also known as a two-point link. The load introduction elements 3 arranged at the body are identically constructed so that the following description as pertains to one of the load introduction elements 3 applies to both. The load introduction elements 3 comprise a fiber-reinforced plastic, particularly SMC (sheet molding compound) or prepreg. The load introduction elements 3 are connected to one another by a profile component 4 produced from a fiber-reinforced plastic material. The load introduction elements 3 have a receiving opening 5 in each instance for receiving a joint arrangement 6. The joint arrangement 6 is preferably constructed as a ball joint. The joint arrangement 6 can also be constructed as a molecular joint. Such a molecular joint comprises an inner part with a ball piece which extends in axial direction thereof and has an at least substantially spherical bearing area. The bearing area is annularly circumferentially enclosed by two elastomer half-shells which are arranged adjacent to one another in axial direction of the inner portion and formed geometrically identical at the same time. The joint arrangement 6 constructed as molecular joint is formed from a bushing which is constructed open to both sides and which is integrated in the load introduction element 3 of the chassis component 1 and the inner part pressed into the latter.

Figure 3:
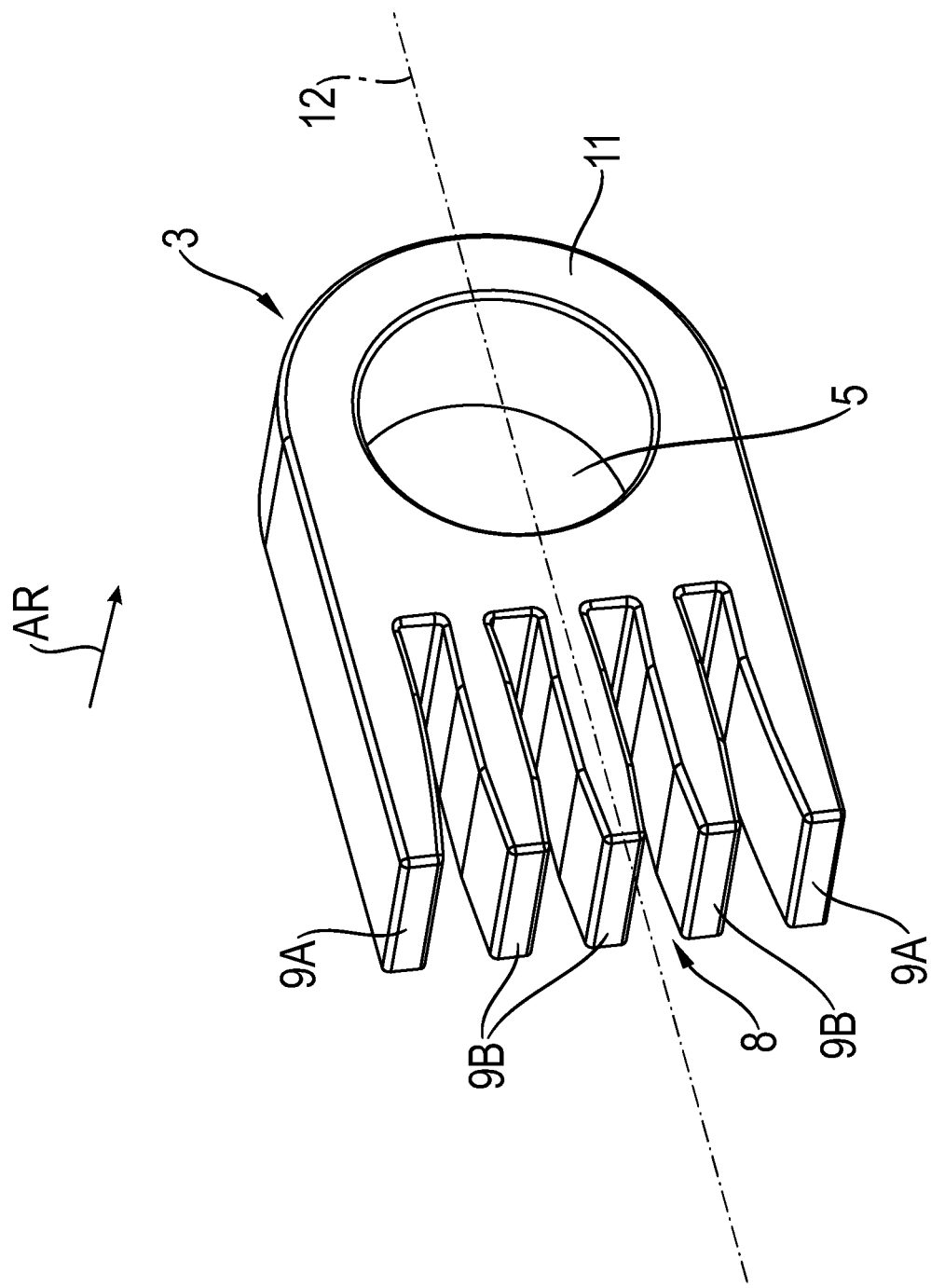
FIG. 3 a schematic perspective view of a load introduction element according to the invention.

FIG. 3 shows a perspective view of the load introduction element 3. The load introduction element 3 has a substantially U-shaped outer contour. The load introduction element 3 has at its end a spline 8 comprising at least three teeth 9A, 9B. In the depicted embodiment example, five teeth 9A, 9B are provided, the two outer teeth 9A of which outwardly overlap the profile component 4 as will be seen from FIG. 2, and the at least one further inner tooth 9B projects into at least one corresponding hollow space of the profile component 4. The at least one inner tooth 9B positively engages with the corresponding hollow space of the profile component 4. The area where the outer teeth 9A overlap with the respective hollow space of the profile component 4 forms a connection portion 7. The length of the teeth 9A, 9B determines the length of the connection portion 7. The teeth 9A, 9B of the spline 8 are additionally connected to the profile component 4 in the region of the connection portion 7 by material bonding by means of gluing, which is indicated by an adhesive layer 10. The load introduction element 3 comprising the fiber-reinforced plastic semifinished product, SMC or prepreg is produced from flat blanks 13, 14, 15 which are arranged in layers one above the other in an assembly direction AR corresponding to the profile direction of the load introduction element 3 and are cut out of the plastic semifinished product. The blanks 13, 14, 15 which are arranged in layers one above the other form a base body 11 of the load introduction element 3. The base body 11 formed from the blanks 13, 14, 15 is inserted into a heatable die or stacked therein and subsequently subjected to a molding process and curing process in a known manner. The longitudinal axis of the load introduction element 3 is designated by 12.

Figure 4C:
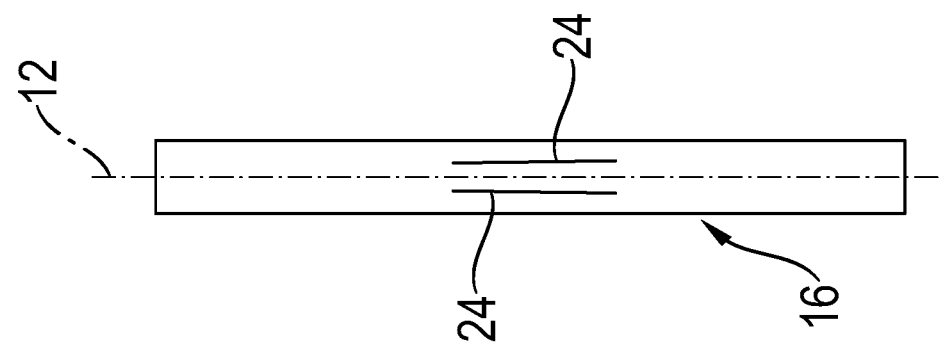
FIG. 4C a schematic front view of its strip-shaped blank which partially surrounds the load introduction element circumferentially.
Figure 4B:
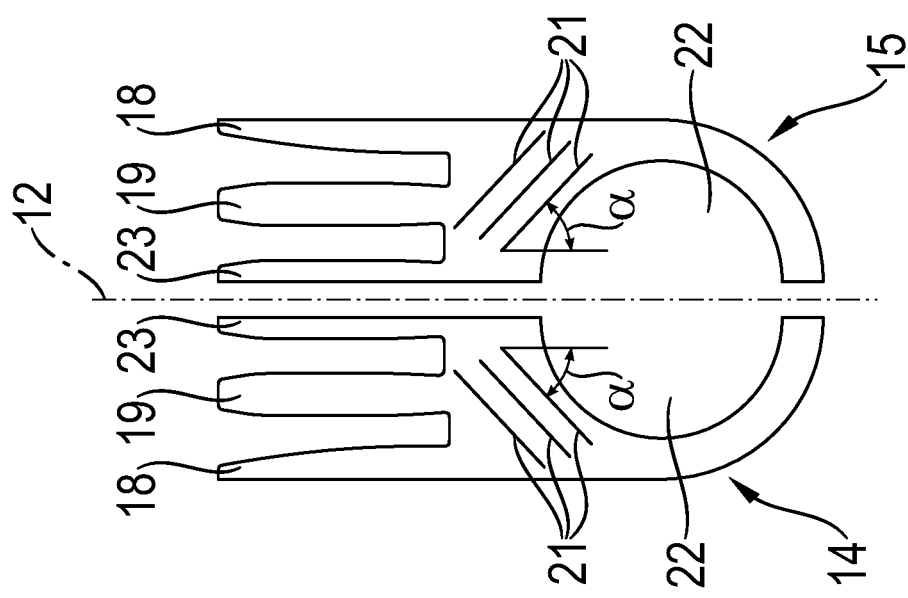
FIG. 4B a schematic front view of two complementary blanks which form portions of the cross-sectional profile of the load introduction element according to FIG. 3.
Figure 4A:
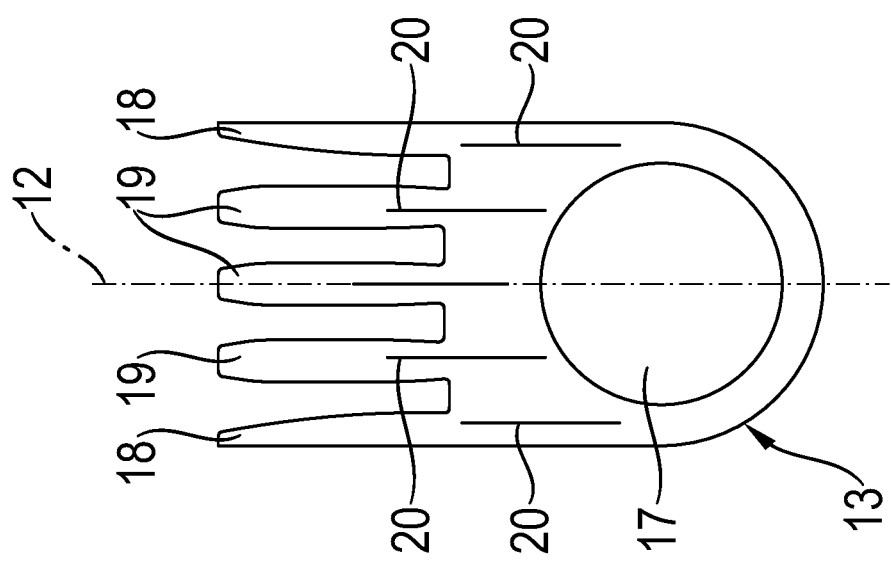
FIG. 4A a schematic front view of a blank corresponding to the full cross-sectional profile of the load introduction element according to FIG. 3.

FIG. 4A shows a schematic front view of a blank 13 which corresponds to the complete cross-sectional profile of the load introduction element 3 according to FIG. 3. The flat blank 13 has a circular recess 17 which is produced by punching from the plastic semifinished product. Outer tooth segments 18 and inner tooth segments 19 have been formed at the end of the blank 13 by the cutting. The blank 13 is formed mirror-symmetrically with respect to the longitudinal axis 12 which forms the symmetry axis of the blank 13. Reinforcement fibers 20 having a defined preferential fiber direction are shown merely by way of example. The preferential fiber direction of the reinforcement fibers 20 of the blank 13 runs parallel to the longitudinal axis 12 of the load introduction element 3 to be produced.

FIG. 4B shows a schematic front view of two complementary blanks 14, 15 which together complement one another to form the cross-sectional profile of the load introduction element 3 according to FIG. 3. Preferably, the blanks 14, 15 respectively form substantially one half of the cross-sectional profile of the load introduction element 3. Correspondingly, the blanks 14, 15 respectively have a semicircular recess 22 and one half of an inner tooth segment 23. The complementary blanks 14, 15 are arranged in layers in a common plane so as to be mirrored along the longitudinal axis 12. Accordingly, the one semicircular recess 22 forms a closed circular recess which is part of the receiving opening 5. The half inner tooth segments 23 of the two complementary blanks 14, 15 form the inner tooth segment 19 as part of one of the inner teeth 9B. The complementary blanks 14, 15 have a preferential fiber direction 21 which is oriented so as to be inclined at an angle α relative to the longitudinal axis 12. The angle α of the preferential fiber direction 21 is not equal to 0°. In this way, forces introduced by the joint arrangement 6 in the region of the receiving opening 5 are introduced into the inner teeth 9B.

Figure 6:
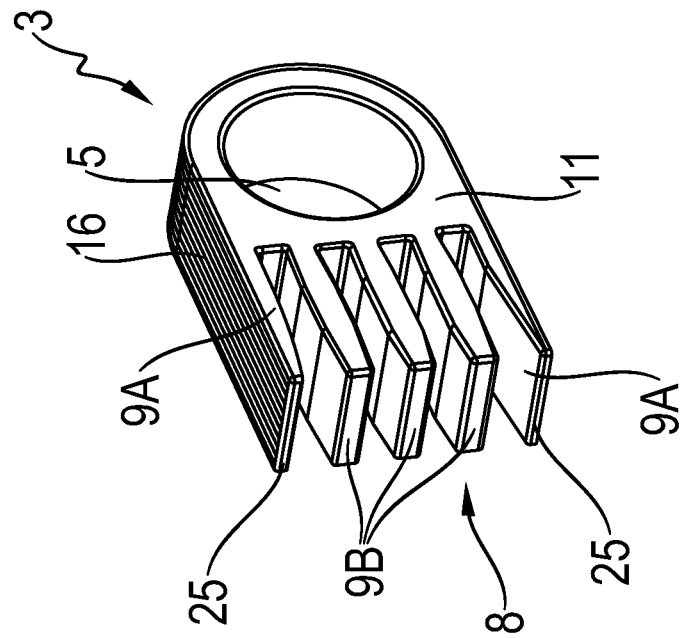
FIG. 6 a schematic perspective view according to FIG. 5.
Figure 5:
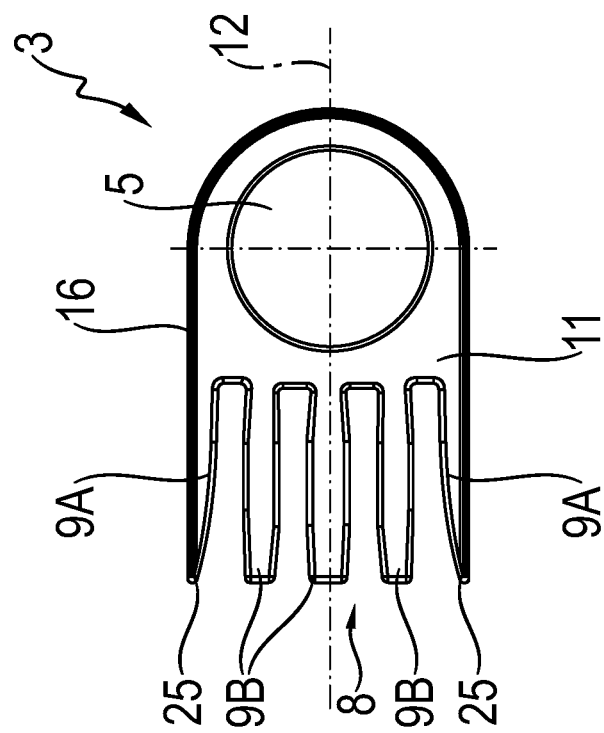
FIG. 5 a schematic front view in profile direction of the load introduction element with a strip-shaped blank arranged around the circumference.

FIG. 4C shows a schematic front view of a strip-shaped blank 16 which partially circumferentially encloses the load introduction element 3 as is illustrated in FIGS. 5 and 6. The longitudinal axis 12 which is also shown here serves as a reference line for a preferential fiber direction 24 of the reinforcement fibers of the blank 16. The preferential fiber direction 24 of the reinforcement fibers of the blank 16 runs parallel to the longitudinal axis 12.

FIG. 5 shows a schematic front view of the load introduction element 3 in profile direction with a strip-shaped blank 16 arranged circumferentially. FIG. 6 shows a schematic perspective view of the load introduction element 3 according to FIG. 5. The blank 16 is highlighted in FIGS. 5 and 6 solely for illustrative purposes. The blank 16 extends between tooth tips 25 at the ends of the outer teeth 9A in circumferential direction of the U-shaped outer contour of the load introduction element 3. The circumferential strip-shaped blank 16 is cut out as a rectangle with the long side in the preferential fiber direction 24 of the plastic semifinished product. The strip-shaped blank 16 is tilted by 90° before placing against the base body 11 so that the preferential fiber direction 24 runs in circumferential direction around the base body 11 of the load introduction element 3. The strip-shaped blank 16 is stressed primarily during tensile loading of the load introduction element 3. The strip-shaped blank 16 particularly reinforces the area surrounding the receiving opening 5 in which the joint arrangement 6 is received.

Figure 7:
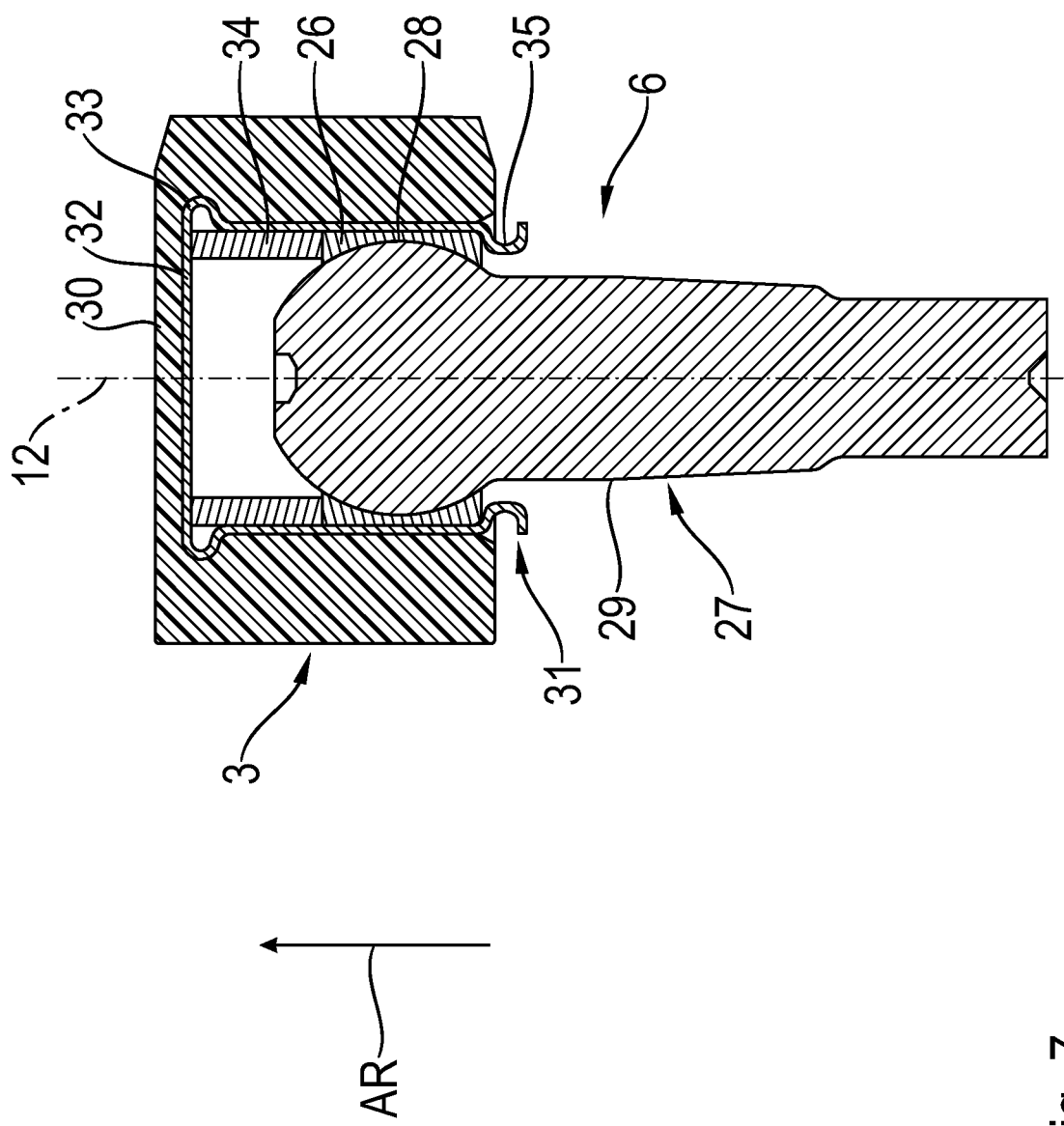
FIG. 7 a schematic sectional view of the load introduction element with a joint arrangement arranged therein.

FIG. 7 shows a schematic sectional view of the load introduction element 3 with a joint arrangement 6 arranged therein. The joint arrangement 6 constructed as ball joint has a bearing bush 26 and a joint body 27 with a spherical portion 28 and a pin-shaped portion 29. The longitudinal axis of the joint body 8 is designated by 14. The bearing bush 26 comprises a hard elastic plastic, particularly polyoxymethylene (POM). The joint body 27 is made of metal, particularly steel.

The joint body 27 is received by its spherical portion 28 by the bearing bush 26 arranged in the receiving opening 5 of the load introduction element 3. The receiving opening 5 is closed above the spherical portion 28 by a cover 30. The cover 30 closes the ball joint 6 and protects it from dirt and penetration of moisture. In the present embodiment example, the cover 30 is formed by at least one blank 13 which, however, has no circular recess 17. A cylindrical sleeve 31 which is formed open to one side is integrated inside of the load introduction element 3 in a positive engagement. The cylindrical sleeve 31 receives the bearing bush 26 and the spherical portion 28 of the joint body 27 of the joint arrangement 6, which spherical portion 28 is arranged in the bearing bush 26. The sleeve 31 is preferably produced from a metallic material. The sleeve 31 has at its closed side a continuous bottom 32 which transitions into a radially outwardly directed bead-shaped portion 33 which partially extends in longitudinal direction of the sleeve 31. A cylindrical supporting body 34 which is axially supported at the bottom 32 is inserted into the interior of the sleeve 31. Further, the sleeve 31 has on its open side a flange-shaped portion 35 which partially protrudes from the receiving opening 5. The bearing bush 26 is supported at the end of the supporting body 34.

The joint arrangement 6 is assembled prior to a molding and curing process of the load introduction element 3. To this end, the supporting body 34, the bearing bush 26 and the joint body 27 are inserted into the sleeve 31. The sleeve 31 is subsequently introduced together with the joint arrangement 6 into the receiving opening 5. Owing to its flowability, the plastic semifinished product of the base body 27 flows into the circumferential undercut of the flange-shaped portion 35 during the molding and curing process and surrounds the bead-shaped portion 33 so that a material bonding and positively engaging connection of the sleeve 31 and load introduction element 3 is achieved. The sleeve 31 is connected to the load introduction element 3 by positive engagement and material bonding. The arrangement of a joint arrangement 6 constructed as molecular joint can be carried out analogously. A cover is omitted. The bushing and the inner part of the molecular joint which is pressed into the latter can be connected to the load introduction element 3 according to the invention by positive engagement and material bonding.

Figure 9:
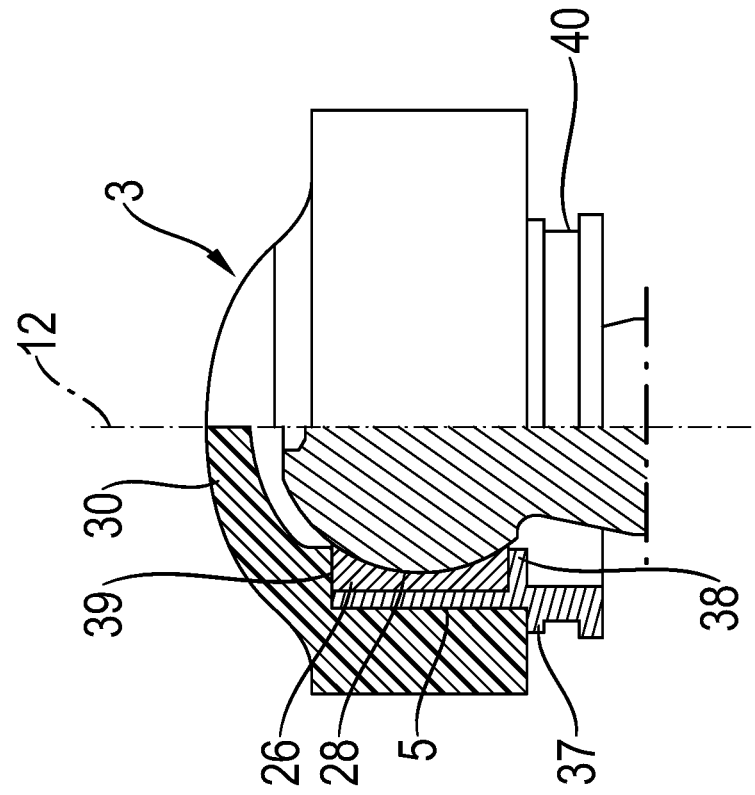
FIG. 9 a schematic partial sectional view of the load introduction element with a joint arrangement according to FIG. 8 arranged therein.
Figure 8:
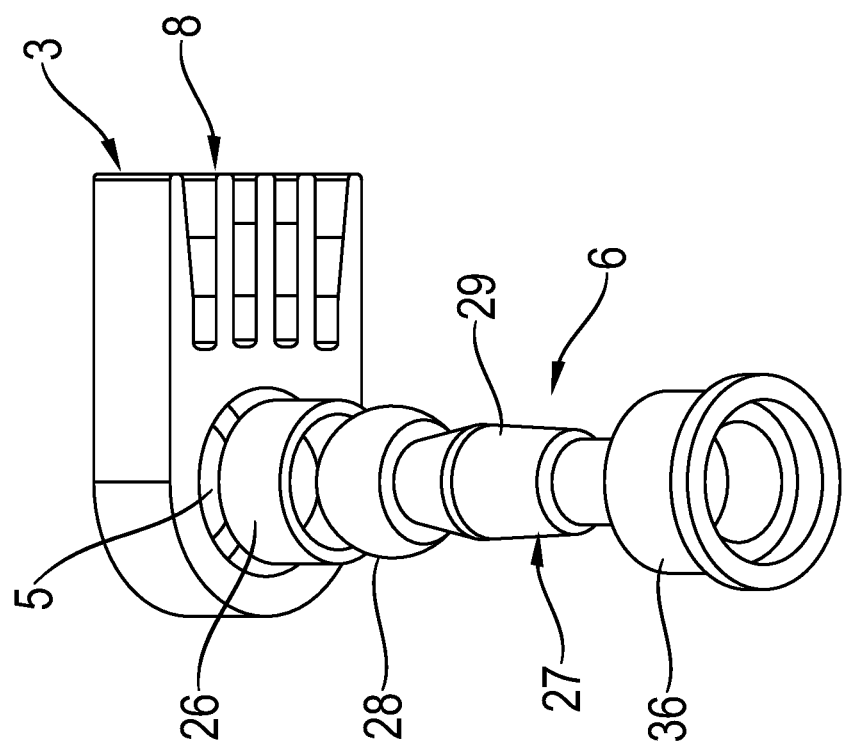
FIG. 8 a schematic perspective view of the load introduction element with a joint arrangement according to a further embodiment form arranged therein.

FIG. 8 shows a schematic perspective view of the load introduction element 3 with a joint arrangement 6 according to a further embodiment form arranged therein. A partial sectional view of the load introduction element 3 with a joint arrangement 6 according to FIG. 8 arranged therein is shown schematically in FIG. 9. FIG. 8 shows component parts of the joint arrangement 6 before being mounted in the load introduction element 3. A hollow-cylindrical cartridge 36 is arranged in the receiving opening 5 of the load introduction element 3 to receive the bearing bush 7 and the joint body 8 arranged therein. The cartridge 36 is formed rotationally symmetrically with reference to the longitudinal axis 12 of the load introduction element 3. The cartridge 36 can be produced by cold extrusion. The cartridge 36 preferably comprises a metallic material, in particular aluminum, an aluminum alloy or a steel.

The cartridge 36 further has a projection 37 which is directed radially outward proceeding from the longitudinal axis 12 and which abuts the underside of the load introduction element 3 facing the pin-shaped portion 27 with its axial end face. The projection 37 can be formed continuous, i.e., fully circumferentially, or can be formed to be segmented in circumferential direction. As a result of the projection 37, the cartridge 36 contacts the underside of the load introduction element 3 so as to be set off in axial direction. On the inner side, the cartridge 36 has a step 38 which is directed radially inward proceeding from the longitudinal axis 12. The bearing bush 26 which is inserted into the cartridge 36 is supported in axial direction on the step 38 by an axial end face of the step 38. Further, a circumferential cutout 40 serving to receive a bellows seal, not shown, is arranged below the projection 37 of the cartridge 36. The load introduction element 3 has a circumferential shoulder-like step 39 above the spherical portion 28 at which the bearing bush 26 and the cartridge 36 are axially supported. The receiving opening is closed by means of a convexly formed cover 30 on the side opposite the spherical portion 28.

The mounting of the bearing arrangement 6 is carried out after the molding and curing process of the load introduction element 3. The bearing bush 26 is inserted together with the joint body 27 into the cartridge 36. The cartridge 36 is subsequently inserted into the receiving opening 5 and is glued to the load introduction element 3.

Figures 10, 11:
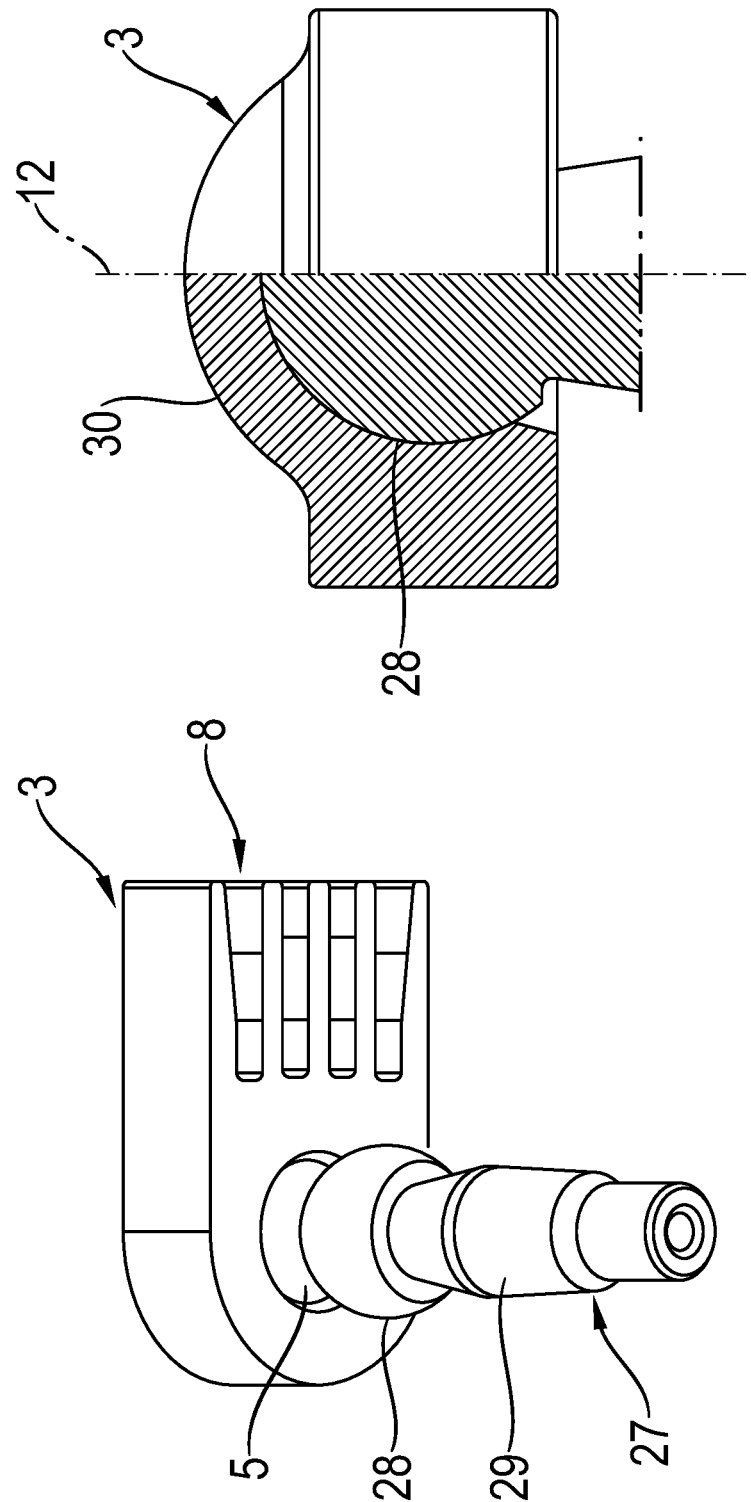
FIG. 10 a schematic perspective view of the load introduction element with a joint arrangement according to a further embodiment form arranged therein.
FIG. 11 a schematic partial sectional view of the load introduction element with a joint arrangement according to FIG. 10 arranged therein.

FIG. 10 schematically shows a perspective view of the load introduction element 3 with a joint arrangement 6 arranged therein according to a further embodiment form. FIG. 11 schematically shows a partial sectional view of the load introduction element 3 with a joint arrangement 6 according to FIG. 10 arranged therein. The spherical portion 28 of the joint body 27 is integrated directly in the load introduction element 3 in this embodiment form. The load introduction element 3 shown in FIG. 10 does not differ from that shown in FIG. 8.

The method according to the invention for producing the load introduction element 3 described above for a chassis component 1 is characterized by the following method steps:
a) cutting a plurality of blanks 13, 14, 15 from a sheet-shaped plastic semifinished product, the blanks 13, 14, 15 having at least two different geometries with different preferential fiber directions 20, 21, 24,
b) arranging the blanks 13, 14, 15, 16 in layers one above the other in an assembly direction (AR) to form a base body 11 of the load introduction element 3, and
c) molding and curing the blanks 13, 14, 15 which are layered to form a base body 11.

The invention claimed is:

1. A load introduction element for a chassis component of a chassis, comprising:
a receiving opening configured to receive a joint arrangement;
a spline with teeth extending substantially axially parallel to a longitudinal axis of the load introduction element;
wherein the load introduction element is made from a fiber-reinforced plastic semifinished product,
wherein the load introduction element comprises flat blanks of the plastic semifinished product which arranged one above the other in layers in an assembly direction (AR) that is perpendicular to an axis of the receiving opening and form a base body of the load introduction element,
wherein the blanks of the base body have at least two different geometries with different preferential fiber directions.

2. The load introduction element according to claim 1, wherein the load introduction element has a substantially U-shaped outer contour which is enclosed by at least one strip-shaped blank produced from the plastic semifinished product, the preferential fiber direction thereof extending perpendicular to the assembly direction (AR).

3. The load introduction element according to claim 1, wherein some of the blanks forming the base body have a contour that corresponds to the complete cross-sectional profile of the load introduction element, and in that some of the blanks have a contour which partially describes the cross-sectional profile of the load introduction element.

4. The load introduction element according to claim 3, wherein the blanks corresponding to the complete cross-sectional profile have a preferential fiber direction which extends parallel to the longitudinal axis of the load introduction element, while the blanks corresponding to the partial cross-sectional profile have a preferential fiber direction that is oriented to be inclined at an angle (a) to the longitudinal axis.

5. The load introduction element according to claim 4, wherein the blanks whose preferential fiber direction is oriented to be inclined at an angle (a) to the longitudinal axis are arranged in a mirror-inverted manner inside of a layer plane.

6. The load introduction element according to claim 1, wherein a cartridge serving to receive the joint arrangement is integrated in the receiving opening of the load introduction element.

7. A load introduction element for a chassis component of a chassis, comprising:
a receiving opening configured to receive a joint arrangement;
a spline with teeth extending substantially axially parallel to a longitudinal axis of the load introduction element;
wherein the load introduction element is made from a fiber-reinforced plastic semifinished product,
wherein the load introduction element comprises flat blanks of the plastic semifinished product which arranged one above the other in layers in an assembly direction (AR) and form a base body of the load introduction element,
wherein the blanks of the base body have at least two different geometries with different preferential fiber directions,
wherein the receiving opening is closed on one side by a cover which is formed integral with the load introduction element.

8. The load introduction element according to claim 7, wherein a radially inwardly directed step on which the cartridge and/or a bearing bush of the joint arrangement are/is supported is formed below the cover.

9. The load introduction element according to claim 8, wherein the cartridge is inserted into the receiving opening prior to a curing process so that a positive engagement connection is brought about by curing.

10. The load introduction element according to claim 8, wherein the cartridge is inserted into the receiving opening after a curing process and bonded to the load introduction element by means of gluing.

11. The load introduction element according to claim 1, wherein a cylindrical sleeve which is formed to be open to one side and which receives a bearing bush and a spherical portion of a joint body of the joint arrangement is integrated in the load introduction element by positive engagement.

12. The load introduction element according to claim 11, wherein the sleeve has at its closed side a continuous bottom which merges into a radially outwardly directed bead-shaped portion which partially extends in longitudinal direction of the sleeve.

13. The load introduction element according to claim 11, wherein the sleeve has a flange-shaped portion on its open side.

14. The load introduction element according to claim 1, wherein a spherical portion of a joint body of the joint arrangement is integrated directly in the load introduction element.

15. A method for producing a load introduction element for a chassis component of a chassis, wherein the load introduction element is formed with a receiving opening for receiving a joint arrangement and a spline, the method comprising:
a) cutting a plurality of blanks from a sheet-shaped plastic semifinished product, wherein the blanks have at least two different geometries with different preferential fiber directions,
b) arranging the blanks in layers one above the other in an assembly direction (AR) to form a base body of the load introduction element (3), and
c) molding and curing the blanks which are layered to form a base body.

16. The method according to claim 15, wherein the load introduction element has a substantially U-shaped outer contour which is enclosed by at least one strip-shaped blank which is produced from the plastic semifinished product and whose preferential fiber direction runs perpendicular to the assembly direction (AR).

17. The method according to claim 15, wherein at least one component part of the joint arrangement is inserted into the receiving opening before or after curing.

18. The method according to claim 17, wherein a sleeve, a cartridge, a bushing or a spherical portion of a joint body is inserted as at least one component part of the joint arrangement into the receiving opening.

19. The method according to claim 17, wherein the component part is inserted into the receiving opening after curing and connected to the load introduction element by gluing.

20. The method according to claim 17, wherein the component part which is inserted into the receiving opening is connected at least by material bonding to the load introduction element by means of the curing.

21. A chassis component for a chassis, comprising a body having at least two load introduction elements which are connected to one another by a profile component, wherein the load introduction elements, respectively, have a receiving opening for receiving a joint arrangement, wherein the load introduction elements are connected to one another with the profile component in a common connection portion by means of a glued spline (8), wherein the load introduction elements comprises:
a receiving opening for receiving configured to receive a joint arrangement;
a spline with teeth extending substantially axially parallel to a longitudinal axis of the load introduction element;
wherein the load introduction element is made from a fiber-reinforced plastic semifinished product,
wherein the load introduction element comprises flat blanks of the plastic semifinished product which arranged one above the other in layers in an assembly direction (AR) and form a base body of the load introduction element,
wherein the blanks of the base body have at least two different geometries with different preferential fiber directions.

22. The chassis component according to claim 21, wherein the spline has at least three teeth, the two outer teeth of which outwardly overlap the profile component, and the at least one further tooth projects into at least one corresponding hollow space of the profile component.

* * * * *